United States Patent
Caro et al.

(10) Patent No.: US 9,760,578 B2
(45) Date of Patent: Sep. 12, 2017

(54) LOOKUP-BASED DATA BLOCK ALIGNMENT FOR DATA DEDUPLICATION

(71) Applicant: INTERNATIONAL BUSINESS MACHINES CORPORATION, Armonk, NY (US)

(72) Inventors: Aviv Caro, Modiin (IL); Danny Harnik, Tel Mond (IL); Ety Khaitzin, Holon (IL); Chaim Koifman, Rishon Lezion (IL); Sergey Marenkov, Tel Aviv (IL); Ben Sasson, Yaffo (IL); Yosef Shatsky, Karnei Shomron (IL); Dmitry Sotnikov, Givataim (IL); Shai I. Tahar, Petach Tikva (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 557 days.

(21) Appl. No.: 14/338,955

(22) Filed: Jul. 23, 2014

(65) Prior Publication Data
US 2016/0026653 A1   Jan. 28, 2016

(51) Int. Cl.
*G06F 17/00* (2006.01)
*G06F 17/30* (2006.01)

(52) U.S. Cl.
CPC .............................. *G06F 17/30159* (2013.01)

(58) Field of Classification Search
CPC ............. G06F 17/30156; G06F 3/0652; G06F 11/1453; G06F 3/0641; G06F 3/0608; G06F 3/0674
See application file for complete search history.

(56) References Cited

U.S. PATENT DOCUMENTS

| | | | | |
|---|---|---|---|---|
| 8,615,798 B2 * | 12/2013 | Smith | ................... | H04L 9/3247 705/50 |
| 8,667,032 B1 | 3/2014 | Shilane et al. | | |
| 8,832,035 B2 * | 9/2014 | Raj | ...................... | G06F 3/0608 707/662 |
| 2010/0250896 A1 * | 9/2010 | Matze | ................... | G06F 3/0608 711/216 |
| 2011/0276543 A1 * | 11/2011 | Matze | ................... | G06F 3/0608 707/692 |
| 2012/0084269 A1 * | 4/2012 | Vijayan | ................. | G06F 3/0652 707/692 |
| 2012/0136842 A1 * | 5/2012 | Zhu | ................... | G06F 17/30156 707/692 |
| 2013/0290277 A1 | 10/2013 | Chambliss et al. | | |

(Continued)

OTHER PUBLICATIONS

Anonymous, "Automatic switch between single instance storage and chunking", Aug. 16, 2012 IP.com Prior Art Database Technical Disclosure, http://ip.com/IPCOM/000220953D.

(Continued)

*Primary Examiner* — Angelica Ruiz
(74) *Attorney, Agent, or Firm* — Griffiths & Seaton PLLC

(57) ABSTRACT

Calculating fingerprints for each one of a multiplicity of alignment combinations of fixed-size deduplication data blocks and comparing each of the fingerprints to stored deduplicated data fingerprints in a lookup database for determining a preferred deduplication data block alignment. A deduplication data block comprises each of the fixed-size deduplication data blocks.

17 Claims, 4 Drawing Sheets

(56) References Cited

U.S. PATENT DOCUMENTS

2013/0290278 A1    10/2013   Aronovich et al.

OTHER PUBLICATIONS

Anonymous, "Efficient De-duplicated Data Extent Discovery", Nov. 30, 2011 IP.com Prior Art Database Technical Disclosure, http://ip.com/IPCOM/000212843D.

Meister, D. et al., "A Study on Data De-duplication in HTC Storage Systems" 11 Pages, 2012 SC—International Conference for High Performance Computing, Networking, Storage and Analysis, IEEE, 2012.

* cited by examiner

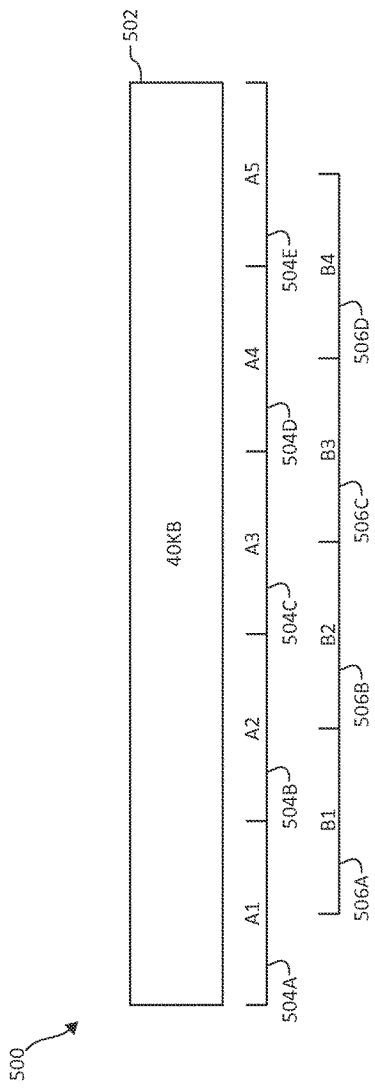

LOOKUP-BASED DATA BLOCK ALIGNMENT FOR DATA DEDUPLICATION

BACKGROUND OF THE INVENTION

Field of the Invention

The present invention relates in general to computers, and more particularly to lookup-based data block alignment for data deduplication in a computing environment.

Description of the Related Art

In today's society, computer systems are commonplace. Computer systems may be found in the workplace, at home, or at school. A data processing system typically includes a processor subsystem having at least one central processing unit (CPU), an input/output (I/O) subsystem, a memory subsystem and a bus subsystem. The memory subsystem of the data processing system typically includes a data storage system having a controller connected to back end storage. The controller controls the flow of data between the data processing system and the back end storage. The controller includes a cache memory that is typically implemented by static memories. During operation, the cache memory serves as a temporary store for data associated with a write I/O request.

These data processing systems may include data storage systems, or disk storage systems, to process and store data. Large amounts of data have to be processed daily and the current trend suggests that these amounts will continue being ever-increasing in the foreseeable future. For the most part, computing systems face a significant challenge to meet the increasingly stringent demands for storing large amounts of data. An efficient way to alleviate the problem is by using deduplication. The idea underlying a deduplication system is to exploit the fact that large parts of the available data is copied again and again and forwarded without any change, by locating repeated data and storing only its first occurrence. Accordingly, it would be desirable to improve and optimize data deduplication.

SUMMARY OF THE DESCRIBED EMBODIMENTS

In one embodiment, a method is provided for lookup-based data block alignment for data deduplication, in a computing environment. In one embodiment, by way of example only, the method calculates fingerprints for each one of a multiplicity of alignment combinations of fixed-size deduplication data blocks and comparing each of the fingerprints to stored deduplicated data fingerprints in a lookup database for determining a preferred deduplication data block alignment. A deduplication data block comprises each of the fixed-size deduplication data blocks.

In another embodiment, a computer system is provided for lookup-based data block alignment for data deduplication, in a computing environment. The computer system includes a computer-readable medium and at least one processor in operable communication with the computer-readable medium. The processor calculates fingerprints for each one of a multiplicity of alignment combinations of fixed-size deduplication data blocks and comparing each of the fingerprints to stored deduplicated data fingerprints in a lookup database for determining a preferred deduplication data block alignment. A deduplication data block comprises each of the fixed-size deduplication data blocks.

In a further embodiment, a computer program product is provided for lookup-based data block alignment for data deduplication, in a computing environment. The computer-readable storage medium has computer-readable program code portions stored thereon. The computer-readable program code portions include a first executable portion that calculates fingerprints for each one of a multiplicity of alignment combinations of fixed-size deduplication data blocks and comparing each of the fingerprints to stored deduplicated data fingerprints in a lookup database for determining a preferred deduplication data block alignment. A deduplication data block comprises each of the fixed-size deduplication data blocks.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which:

FIG. 5 is a block diagram illustrating lookup-based data block alignment for data deduplication in which aspects of the present invention may be realized.

DETAILED DESCRIPTION OF THE DRAWINGS

Figure 1:
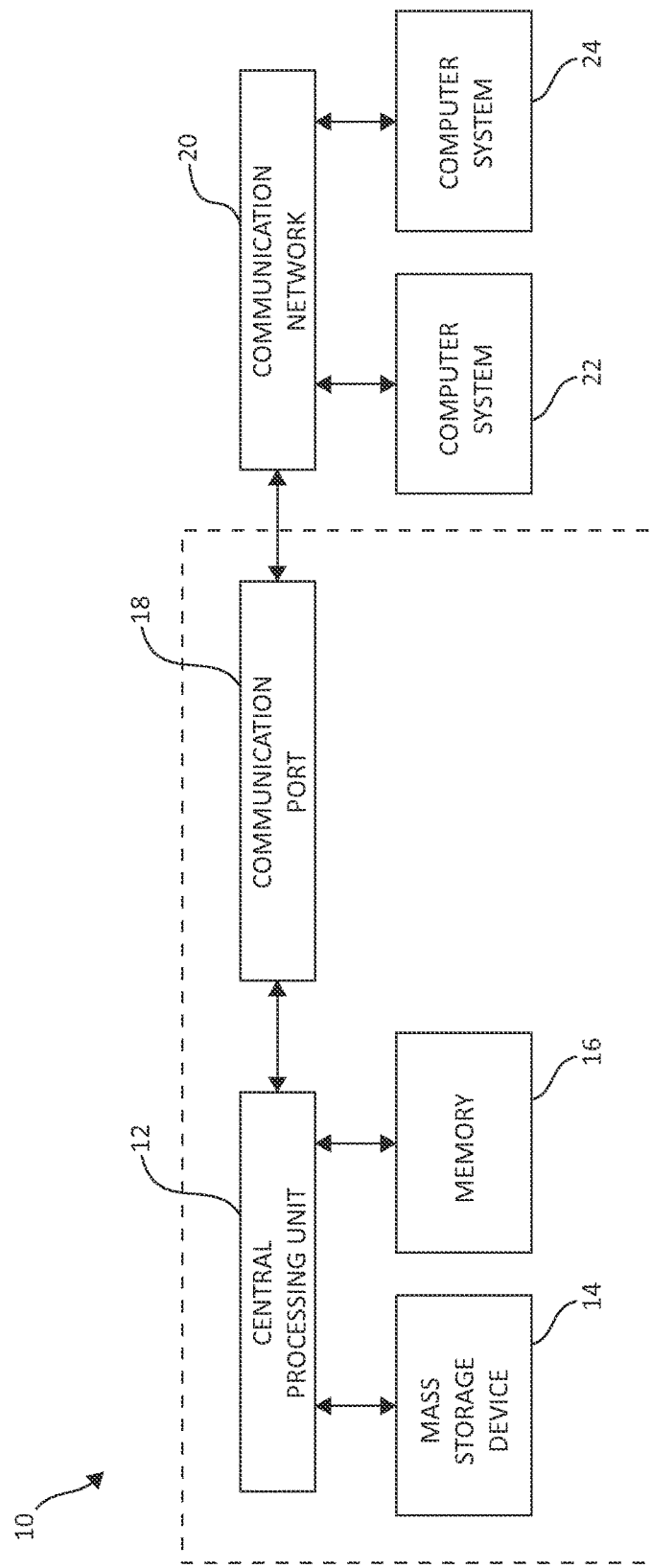
FIG. 1 is a block diagram illustrating a computing system environment having an example storage device in which aspects of the present invention may be realized.

As mentioned above, large amounts of data have to be processed daily and the current trend suggests that these amounts will continue being ever-increasing in the foreseeable future. Deduplication is a storage saving technique that is highly successful in enterprise storage. Data deduplication systems are increasingly utilized because they help reduce the total amount of physical storage that is required to store data. This reduction is accomplished by ensuring that duplicate data is not stored multiple times. By removing duplicates within and across files. The idea underlying a deduplication system is to exploit the fact that large parts of the available data is copied again and again and forwarded without any change, by locating repeated data and storing only its first occurrence. Data entrusted to a deduplicating system often times is required to be exported and/or backed up to a different site. Deduplication reduces bandwidth and storage capacities. For example, for workloads with inherent repetitions, deduplication is reported to reduce capacity with ratios ranging between 1:2 and 1:50 in backup environments, and up to 1:10 in virtual machine environments.

Deduplication may be achieved by splitting the incoming data into deduplication chunks (e.g., using chunking strategies) and computing a fingerprint (e.g., a cryptographic fingerprint) on each chunk. Repeating chunks are then identified by lookups into a fingerprint database (DB) that stores the fingerprints of chunks in the system. In other words, following the splitting of the incoming data, each chunk is classified as redundant or unique by checking if the fingerprint has already been stored. Only data of unique chunks is stored because the deduplication operation only stores the unique data, while dropping data, which has been previously stored.

In data deduplication, data chunking used for deduplication presents two central issues: 1) the data chunk size, and 2), the data chunk alignment. For the data chunk size, smaller chunks have increased deduplication potential since shorter repetitions may also be found and eliminated. However, there is a management overhead for each chunk being handled, and therefore, a smaller chunk size will result in more metadata and management overheads. In large scales of data chunks, increased metadata and management overhead reduces computing efficiency and causes either degradation in speed and/or a loss in potential effective deduplication ratio, simply by discarding some of the metadata due to capacity limitations. As pertaining to the alignment issues, a simple implementation will use a fixed chunk size, and then a natural/normal option is to look at chunks starting at the beginning of the data stream and looking at aligned chunks according to this starting point (e.g., the beginning of the data stream). However, this process is prone to alignment issues. For example, if the data chunk size is 8 kilobytes (KB) but a repetition in the data occurs at a distance that is not a multiple of 8 KB (for example at a distance 12 KB) then this repetition of data will not produce a repetition in chunks and no deduplication will be gained/detected.

In one embodiment, a solution to the alignment challenge is to work with variable sized chunks. In this process, the actual data context in order is used to semi-randomly chunk the data according to special "chunking events." The benefit is that two streams with long repetitions are likely to be chunked in the same alignment (with respect to the actual content of the repetition). However, this solution typically works at a byte level, takes a computational overhead, and only works for lengthy incoming data streams. For systems that receive data in limited sized data blocks (e.g. a hyper text transfer protocol (http) packets, flushes from a cache, etc.), this method would fail unless a long stream is provided or assembled.

In one embodiment, a solution is to look at chunks from several different granularities (e.g. each 64 KB is either broken into 2 chunks of size 32 KB or 4 chunks of size 16 KB, etc.). Then a repetition may be identified either as a chunk of small size or preferably at a chunk of a larger size. Yet the problem with this solution is that a larger number of chunks need to be handled and remembered since chunks at more granularities are checked. The extra chunks are typically maintained in a data base or index table (with a hash of the chunk's content as a representative) and the size of this index table is typically a limiting factor. So an increase of the number of chunks that need to be represented may limit the amount of data segments that can be deduplicated against. In addition to the above, the smallest chunk size can be larger than the alignment size and, therefore, the alignment issue remains unsolved.

Thus, the present invention seeks to provide a solution most relevant to this second issue of alignment and also is motivated by the preference for using larger chunks and to be applied to each of these solutions stated above. In one embodiment, the present invention provides a solution for lookup-based data block alignment for data deduplication, in a computing environment. In one embodiment, by way of example only, the present invention uses a deduplication data block greater in size than a file system data block for the data deduplication by calculating fingerprints for a multiplicity of alignment combinations of fixed-size deduplication data blocks and comparing each of the fingerprints to stored deduplicated data fingerprints for determining a preferred deduplication data block alignments based on a multiplicity of rules for optimized data deduplication. The deduplication data block comprises each of the fixed-size deduplication data blocks.

More specifically, in one embodiment, the present invention provides a solution for deduplication for computing systems that work with a specific page size and/or specific, fixed sized data chunk. For instance a file system with an underlying data block size is 1 KB, 4 KB or 64 KB. In such systems the deduplication opportunities are likely to be at this granularity. However, as mentioned above, problems arise when the deduplication mechanism works at a data chunk size that is larger than the file system's block size. For example, if the deduplication is done with block size of 8 KB, but the file system works at 4 KB write sizes. In such a scenario, a repetition may be missed (and not deduplicated) due to misalignment. This scenario is relevant because of the tradeoffs of deduplication chunk size mentioned above and the preference of having a larger chunk size to relieve the burden of metadata handling.

In one embodiment, the present invention address the challenges of data chunking by addresses the issued regarding data chunk sizes and data chunk alignment issues. In one embodiment, the present invention allows for near optimal deduplication with limitations on capabilities of the amount of metadata that may be handled. In one embodiment, metadata relief is achieved by using a larger deduplication chunk size than the optimal choice for a file system's data block size (e.g., the natural/normal system block size in terms of data reduction ratio). In one embodiment, the present invention then adjusts alignment of data chunks to achieve higher deduplication savings.

In one embodiment, the present invention computes fingerprints for each fixed sized data chunk at all possible data chunk alignments. The choice of which data chunk alignment to select is done by looking up for all of the computed fingerprints (calculated for a multiplicity of alignments of chunks) matches of stored fingerprints in the deduplication fingerprint database (the one used for the actual deduplication process). A variety of criteria may be used (e.g., predefined criteria and/or user defined criteria) for deciding which data chunks will be stored and at which of the numerous, possible data alignments, according to the deduplication potential of the numerous, possible data alignments, as indicated by a deduplication mechanisms (e.g., the deduplication mechanism may be located in the fingerprint data base). Since the number of alignment possibilities is small, the data chunking may be performed with very low overhead. Still, if entire data streams are replicated at different alignments, this repetition will be identified using the present invention, and deduplication of this content will be achieved. In one embodiment, the present invention achieves increased deduplication ratios with less metadata and without any significant computational costs.

Turning now to FIG. 1, exemplary architecture 10 of a computing system environment is depicted. The computer system 10 includes central processing unit (CPU) 12, which is connected to communication port 18 and memory device 16. The communication port 18 is in communication with a communication network 20. The communication network 20 and storage network may be configured to be in communication with server (hosts) 24 and storage systems, which may include storage devices 14. The storage systems may include hard disk drive (HDD) devices, solid-state devices (SSD) etc., which may be configured in a redundant array of independent disks (RAID). The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer host systems 24. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

Figure 2:
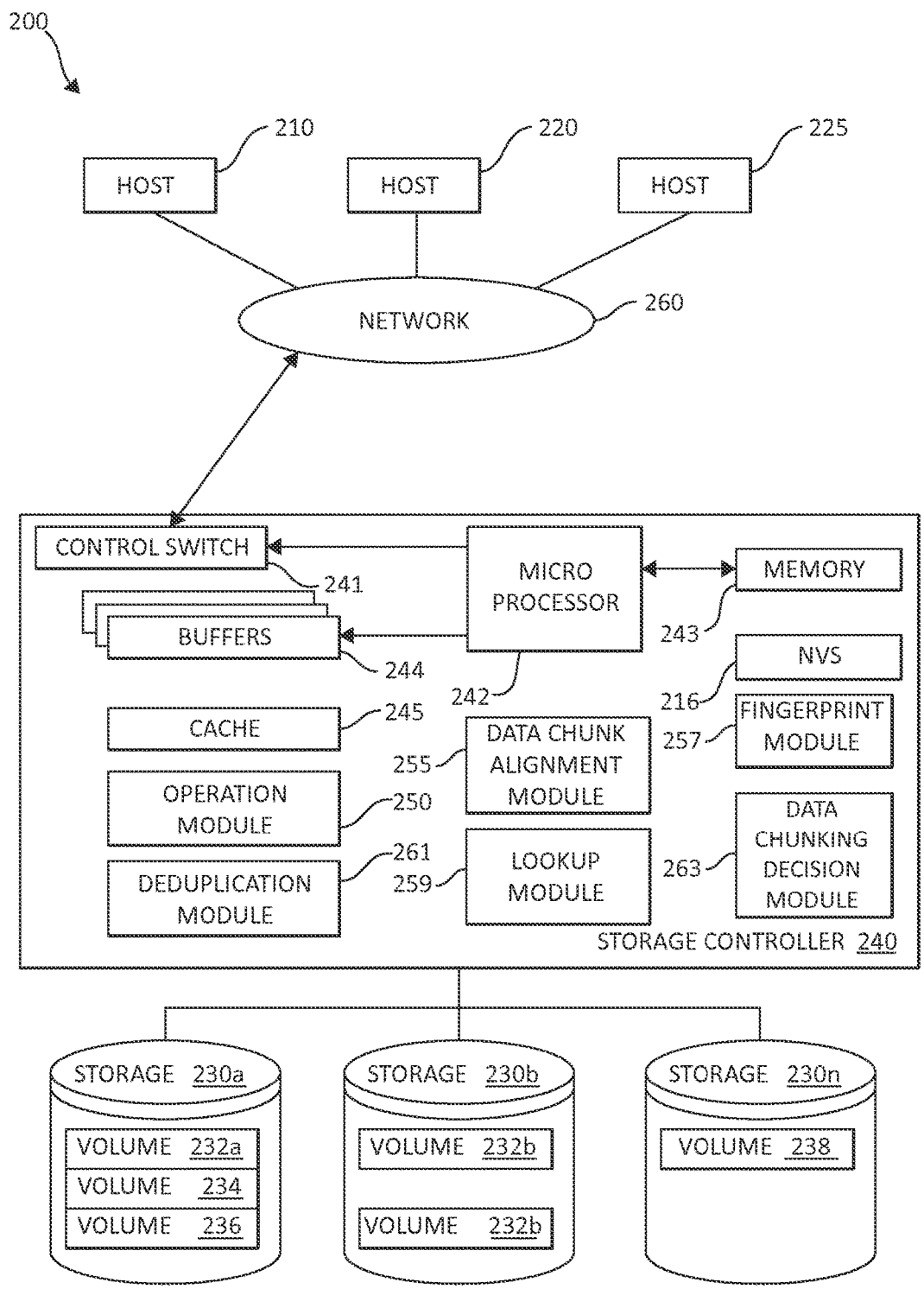
FIG. 2 is a block diagram illustrating a hardware structure of data storage system in a computer system in which aspects of the present invention may be realized.

FIG. 2 is an exemplary block diagram 200 showing a hardware structure of a data storage system in a computer system according to the present invention. Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200. In one embodiment, by way of example only, a data storage system 200 may be implemented as IBM® System Storage™ DS8000™. A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adaptor 260 to communicate. Data storage system 200 is depicted in FIG. 2 comprising storage controllers 240 and cluster hosts 210, 220, and 225. The cluster hosts 210, 220, and 225 may include cluster nodes.

To facilitate a clearer understanding of the methods described herein, storage controller 240 is shown in FIG. 2 as a single processing unit, including a microprocessor 242, system memory 243 and nonvolatile storage ("NVS") 216. It is noted that in some embodiments, storage controller 240 is comprised of multiple processing units, each with their own processor complex and system memory, and interconnected by a dedicated network within data storage system 200. Storage 230 (labeled as 230a, 230b, and 230n in FIG. 3) may be comprised of one or more storage devices, such as storage arrays, which are connected to storage controller 240 (by a storage network) with one or more cluster hosts 210, 220, and 225 connected to each storage controller 240.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps of the present invention for executing and managing storage 230 as described herein. In one embodiment, system memory 243 includes, is in association with, or is in communication with the operation software 250 for performing methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a data chunk alignment module 255, a fingerprint module 257, a lookup module 259 (e.g, a lookup database/lookup index containing existing fingerprints existing in the computing system), a deduplication module 261, and a data chunk decision module 263. The data chunk alignment module 255, the fingerprint module 257, the lookup module 259, the deduplication module 261, and the data chunk decision module 263 may work in conjunction with each and every component of the storage controller 240, the hosts 210, 220, 225, and storage devices 230. The data chunk alignment module 255, the fingerprint module 257, the lookup module 259, the deduplication module 261, and the data chunk decision module 263 may be structurally one complete module or may be associated and/or included with other individual modules. The data chunk alignment module 255, the fingerprint module 257, the lookup module 259, the deduplication module 261, and the data chunk decision module 263, may also be located in the cache 245 or other components.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control, cache 245 for temporarily storing (buffering) data, and buffers 244 for assisting the cache 245 to read and write data, a control switch 241 for controlling a protocol to control data transfer to or from the storage devices 230, the data chunk alignment module 255, the fingerprint module 257, the lookup module 259, the deduplication module 261, and the data chunk decision module 263, in which information may be set. Multiple buffers 244 may be implemented with the present invention to assist with the operations as described herein. In one embodiment, the cluster hosts/nodes, 210, 220, 225 and the storage controller 240 are connected through a network adaptor (this could be a fibre channel) 260 as an interface i.e., via at least one switch called "fabric."

In one embodiment, the host computers or one or more physical or virtual devices, 210, 220, 225 and the storage controller 240 are connected through a network (this could be a fibre channel) 260 as an interface i.e., via at least one switch called "fabric." In one embodiment, the operation of the system shown in FIG. 2 will be described. The microprocessor 242 may control the memory 243 to store command information from the host device (physical or virtual) 210 and information for identifying the host device (physical or virtual) 210. The control switch 241, the buffers 244, the cache 245, the operating software 250, the microprocessor 242, memory 243, NVS 216, the data chunk alignment module 255, the fingerprint module 257, the lookup module 259, the deduplication module 261, and the data chunk decision module 263 are in communication with each other and may be separate or one individual component(s). Also, several, if not all of the components, such as the operation software 250 may be included with the memory 243. Each of the components within the devices shown may be linked together and may be in communication with each other for purposes suited to the present invention.

As mentioned above, the data chunk alignment module 255, the fingerprint module 257, the lookup module 259, the deduplication module 261, and the data chunk decision module 263, may also be located in the cache 245 or other components. As such, one or more of the data chunk alignment module 255, the fingerprint module 257, the lookup module 259, the deduplication module 261, and the data chunk decision module 263, maybe used as needed, based upon the storage architecture and users preferences.

As described herein, in the data de-duplication, de-duplication blocks greater than data blocks are used. Fingerprints, of all the possible combinations of data blocks making/comprising the de-duplication blocks, are calculated. The fingerprints are compared to stored de-duplicated data fingerprints, and the best fingerprints (e.g., highest deduplication ratio) are selected to test for de-duplication. The fingerprints for fixed size chunks at all number of possible alignments are calculated, and the decision for selecting the most optimized data block alignment (e.g., fixed-size deduplication data block alignments comprising the larger data block) to select is done by searching for all of computed possible fingerprints in the de-duplication fingerprint database. The alignment of data chunks/blocks is adjusted to achieve an optimized data deduplication yielding higher de-duplication efficiency.

Figure 3:
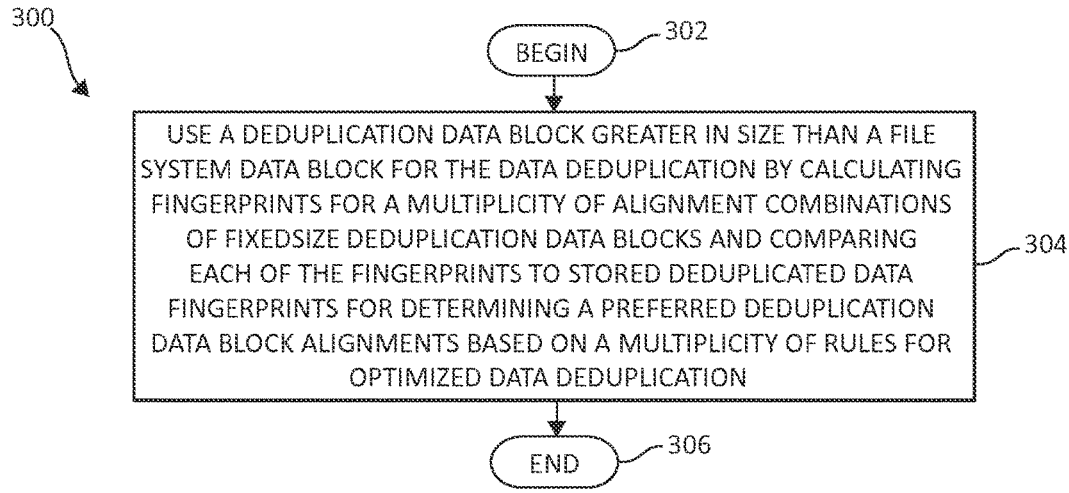
FIG. 3 is a flowchart illustrating an exemplary method for lookup-based data block alignment for data deduplication in which aspects of the present invention may be realized.

FIG. 3 is a flowchart illustrating an exemplary method 300 for lookup-based data block alignment for data deduplication in which aspects of the present invention may be realized. The method 300 begins (step 302) by using a deduplication data block greater in size than a file system data block for the data deduplication by calculating fingerprints for a multiplicity of alignment combinations of fixed-size deduplication data blocks and comparing each of the fingerprints to stored deduplicated data fingerprints for determining a preferred deduplication data block alignments based on a multiplicity of rules for optimized data deduplication (step 304). The deduplication data block comprises each of the fixed-size deduplication data blocks. The method 300 ends (step 306).

In one embodiment, the present invention follows 3 clear steps: 1) a fingerprint computation, 2) a database lookup operation, and 3) a data chunk decision operation. First, for the fingerprint computation: the present invention traverses (e.g. goes over) all relevant chunking possibilities of the data at hand and computes fingerprints for each of the possible chunks. A variety of options may be used to implement the fingerprint computations and may be performed with similar computational cost to any other chunking strategies, as described herein. Second, for the database (DB) lookup operation, the present invention looks up all of the generated fingerprints in a deduplication DB. The lookup operation may be performed in parallel or sequentially, depending on the circumstances, computing system, predefined rules, and/or user preferences. Third, for the data chunking decision operation, the present invention uses a set of rules to decide on a final chunking of the data stream based on the lookup results (and the current system state). The rules may be stated in the form of a decision table, logic or any other implementation.

Figure 4:
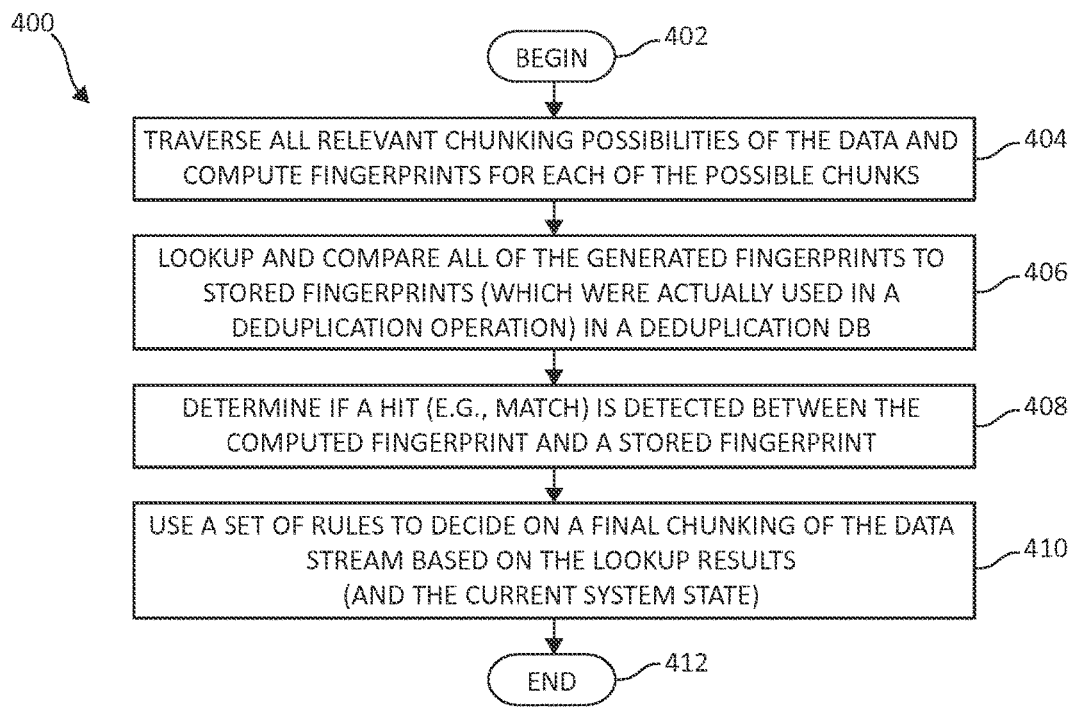
FIG. 4 is a flowchart illustrating an additional exemplary method for lookup-based data block alignment for data deduplication in which aspects of the present invention may be realized.

FIG. 4 is a flowchart illustrating an additional exemplary method 400 for lookup-based data block alignment for data deduplication in which aspects of the present invention may be realized. The method 400 begins (step 402) by traversing all relevant chunking possibilities of the data and compute fingerprints for each of the possible chunks (step 404). There are many options to implement this step and it typically can be performed with similar computational cost to any other chunking strategy (as will be described in embodiments below). The method 400 looks up and compares all of the generated fingerprints to stored fingerprints (which were actually used in a deduplication operation) in a deduplication DB (step 406). The lookup operation may be performed in parallel or sequentially, depending on the circumstances, computing system, predefined rules, and/or user preferences. The method 400 determines if a hit (e.g., match) is detected between the computed fingerprint and a stored fingerprint (step 408). The method 400 uses a set of rules to decide on a final chunking of the data stream based on the lookup results (and the current system state) (step 410). The method 400 ends (step 412).

FIG. 5 is a block diagram 500 illustrating lookup-based data block alignment for data deduplication in which aspects of the present invention may be realized. By way of example only, a computing system has a 40 Kb block of data with underlying chunk block sizes of 4 KB, but deduplication chunk size of 8 KB is being considered. However, this may be generalized for every combination of file block size and (larger) deduplication chunk size. Each deduplication chunk is of length 8 KB, and may begin at any 4 KB alignment offset. For example, in FIG. 5 there is a 40 KB data stream 502. There are two possible alignments 504 and 506 to chunk the 40 KB data block 502; one alignment is an even data chunk alignment 504 and a second alignment is an odd data chunk alignment 506 (however, the odd data chunk alignment 506 (B1-B4) is missing out on the first 4 KB and the last 4 KB of the 40 Kb block of data. The even data chunk alignment 504 is illustrated as A1 504A, A2 504B, A3 504C, A4 504D, and A5 504E. The odd data chunk alignment 506 is illustrated as B1 506A, B2 506B, B3 506C, and B4 506D. Altogether, FIG. 5 illustrates that there are 9 possible 8 KB data chunks. For both the even alignment 504 (e.g., A1 . . . A5) and the odd alignment 506 (e.g., B1 . . . B4) fingerprints are calculated. The fingerprints used for the 8 KB chunks 504 and 506 will be defined as a combination of two fingerprints of the relevant, underlying 4 KB blocks (e.g., take a concatenation or a cryptographic hash function calculation over the underlying fingerprints). It should be noted that the overhead of the computation of the combination of fingerprints is negligible as compared to the computation of the fingerprints. Therefore the computation complexity of the fingerprint calculation of the aligned data blocks 504 and 506 is comparable to computing fingerprints on 4 KB blocks, or alternatively, computing fingerprints on 8 KB chunks of a single alignment (e.g. just A1, . . . , A5 or 504A-E). It should be noted that the even alignment 504 and the odd alignment 506 are designated "even" and "odd" for illustration purposes and could be relabeled In one embodiment, the present invention may decide the final data chunking alignment(s) for data deduplication based on one of a variety of options, rules, and/or hints. In one embodiment, the present invention may calculate and consider all fingerprints for each data chunk block in one of the possible data alignments (e.g., 9 fingerprints 504A-E and 506A-D) and determine how many hits (e.g., matches) the lookup operation found in the fingerprint database for either the even data chunk alignments 504 and/or odd data chunk alignments 506. According to the most hits (highest deduplication potential), the present invention may choose one of the alignments 504 or 506. In one embodiment, if the number of hits is equal, the present may choose the even data chunk alignment 504 (e.g., A1, . . . , A5), as in the odd data chunk alignment 506 the first and last 4 KB chunks are omitted, and will not be considered for future deduplication opportunities. This option may be adapted differently depending on the data stream 502 length. It should be noted that "equal" means an equal number of hits between the even and odd alignments. A hit means that a specific hash was found in the repository (e.g., lookup index/library). In one embodiment, the numbers of hits are counted for even hashes to compare those counted of odd hashes. If the number for even is equal to the number for odd, then both alignments are equally beneficial. In this case, the present invention may refer to the decision (e.g., which alignment was taken on the previous data, and keep the same alignment as before).

In one embodiment, the present invention traverses over the data chunks 504 and 506 sequentially (and/or in parallel), and at each point in turn, which at first would be 504A and/or 506A hold a current alignment variable and consider the next two chunks 504B and 506B, one from the even and one from the odd alignment (e.g., at the beginning the alignment is even and A1, B1 are considered). (At each point in turn would first be 504A but it will progress throughout the entire data block). Out of the two possible data chunks 504A and 506B choose the chunk 504 or 506 with the current, adjusted alignment, unless it does not have a hit in the lookup and the chunk at the other alignment does have a hit. In this case, the present invention skips the upcoming 4 KB block, and chooses the second chunk (a second data chunk from 504 or 506) and changes the current alignment.

In one embodiment, either the even or the odd data chunk alignment 504 or 506 is selected for the entire data stream 502, depending only on the lookup results of the first two chunks A1 504A and B1 506A. The even alignment is selected unless B1 506A has a hit (e.g., match) and A1 504A does not have a hit. This option reduces the total number of lookups to the DB.

In one embodiment, either one of the two possible alignments 504 or 506 may be used but the choice of which of the two possible alignments 504 or 506 should be consistent. In one embodiment, the present invention may calculate and consider all fingerprints for each data chunk block in one of the possible data alignments (e.g., 9fingerprints 504A-E and 506A-D) and determine how many hits (e.g., matches and the newly calculated fingerprint already exists in the lookup database) the lookup operation found in the fingerprint database for either the even data chunk alignments 504 and/or odd data chunk alignments 506. (Potential deduplication efficiency is achieved if there is a hit). The 4 KB blocks are the first half of A1 and the second half of A1, which also happens to be the first half of B1 and so forth for each A and B. In other words, the fingerprints are calculated for all of the 4 KB A1-A5 blocks (504A-504E) and all of the 4 KB B1-B4 blocks (506-506D). The fingerprints used for the 8 KB chunks 504 and 506 will be defined as a combination of two fingerprints of the relevant, underlying 4 KB blocks (e.g., take a concatenation or a cryptographic hash function calculation over the underlying fingerprints). It should be noted that the overhead of the computation of the combination of fingerprints is negligible as compared to the computation of the fingerprints. Therefore the computation complexity of the fingerprint calculation of the aligned data blocks 504 and 506 is comparable to computing fingerprints on 4 KB blocks, or alternatively, computing fingerprints on 8 KB chunks of a single alignment (e.g. just A1, . . . , A5 or 504A-E). In other words (relating to the overhead of the computation of the combination of fingerprints is negligible as compared to the computation of the fingerprints), the cost of computing a fingerprint is rather high (and is a function of the block length) rather than computing the signature of A1 (length 8 KB) and B1 (length 8K), so the present invention computes the fingerprints of the three (3) 4 KB locks that form A1 and B1. It is only three (3) because the middle 4 KB block overlaps. Computing a combination of two halves is a cost effective operation, so the overall cost of computing is over 12 KB (3 times 4 KB) rather than 16 KB (2 times 8 KB).

Next, the present invention determines how many hits (e.g., matches) the lookup operation found in the fingerprint database/lookup database (e.g., repository) for either the even data chunk alignments 504 and/or odd data chunk alignments 506. According to the most hits (highest deduplication potential), the present invention may choose one of the alignments 504 or 506 based on what is already observed in the computing system. If the number of hits of A is more than the number of hits of B, than the even alignments 504 (A1-A5) may be used. If the number of hits of B is more than the number of hits of A, than the odd alignment 506 (B1-A4) may be used. In one embodiment, if the number of hits is equal, the present may choose the even data chunk alignment 504 (e.g., A1, . . . , A5), as in the odd data chunk alignment 506 the first and last 4 KB chunks are omitted, and will not be considered for future deduplication opportunities. This option may be adapted differently depending on the data stream 502 length.

In one embodiment, the present invention may mix-and-match (interchange between the alignments using a step-by-step approach) the alignments (e.g, procedurally going from an odd to even and then back to odd and then back to even so as to procedurally and subsequently alternating back and forth from even to odd or odd to even) for selecting a preferred deduplication data block alignment, wherein the deduplication data block comprises each of the fixed-size deduplication data blocks. For example, A1 (504A) may be determined as the starting point in the even alignment 504 and the fingerprint for A1 (504A) is calculated. The fingerprint database/lookup database is now used to determine if the newly calculated fingerprint for A1 (504A) exists. If the newly calculated fingerprint for A1 (504A) exists than the alignment is proper since deduplication is identified and then present invention moves on to A2 (504B). If the newly calculated fingerprint for A1 (504A) does not exist, the present invention moves over to the odd alignment 506 and calculates the fingerprint for B1 (506A) so as to determine if B1's newly calculated fingerprint is in the look up database. If the newly calculated fingerprint for B1 (506A) exists in the lookup database, then the present invention switches to the even alignment as the preferred alignment. Now, the present invention calculates the fingerprint for B2 (506B) so as to determine if B2's newly calculated fingerprint is in the look up database. If the newly calculated fingerprint for B2 (506B) exists in the lookup database, than the alignment is a preferred alignment since deduplication is identified and then present invention moves on to B3 (506C). If the newly calculated fingerprint for B2 (506B) does not exist, the present invention moves back over to the even alignment 504 and calculates the fingerprint for A3 (504C) so as to determine if A3's newly calculated fingerprint is in the look up database. Notice, that every time the present invention switches to the alternative alignments, than one of the 4 KB chunks is not going to be accounted for and is skipped (e.g., not mapped). For example, suppose the present invention is at B1 and the present invention looks up A3 and A3 is located in the look up database, than B2 (4 KB) is skipped because it was not located and identified in the look up database. So in other words, the present invention will choose an alignment and continue with that alignment until one of the fingerprints for a data chunk block in the chosen alignment is not identified, and then the present invention will jump over to the next alignment. Thus, in the example above, the present invention is at B1 (506A in the odd alignment 506) and continues with the odd alignment 506 and goes to B2 but if B2 is not in the lookup database the present invention moves over to A3 (504C) of the even alignment 504 database.

In one embodiment, the lookup operation may be tailored to the decision making process. For example, the present invention may lookup all of the upcoming chunks in parallel, and lookup two upcoming chunks at a time, and in the decision making process only lookup only the first two chunks. In one embodiment, additional hints from the lookup are provided, such as the strength of a hit, the locality/position of the fingerprint matches, and/or any other system related information or user defined hints, and incorporates this information into the decision rules for selecting the data block alignments for data deduplication. In other words, there are two different actions 1) looking up fingerprints of chunks, and 2) deciding which chunks and alignments to go by. How to do step 1 (the lookup operations) should take into consideration the decision logic—for example, if it is required to know the lookup results for all chunks involved before making a decision then make all of the lookups in one batch call. On the other hand, if only 2 of these results are needed for a local decision, then do 2 lookup operations only, and according to this result continue with further lookups.

In one embodiment, for lookup-based data block alignment for data deduplication in a computing environment, a deduplication data block greater in size than a file system data block for the data deduplication is used by calculating fingerprints for a plurality of alignment combinations of fixed-size deduplication data blocks and comparing each of the fingerprints to stored deduplicated data fingerprints for determining a preferred deduplication data block alignments based on a plurality of rules for optimized data deduplication, wherein the deduplication data block comprises each of the fixed-size deduplication data blocks. In one embodiment a plurality of hints are provided for determining the preferred deduplication data block alignments.

In one embodiment, the present invention calculates fingerprints for each one of a plurality of alignment combinations of fixed-size deduplication data blocks and comparing each of the fingerprints to stored deduplicated data fingerprints in a lookup database for determining a preferred deduplication data block alignment, wherein the deduplication data block comprises each of the fixed-size deduplication data blocks.

In one embodiment, the present invention performs all of and/or at least one of: determining which one of the plurality of alignment combinations to use as the preferred deduplication data block alignment, and providing a plurality of hints for determining the preferred deduplication data block alignments. In one embodiment, the present invention adjusts the plurality of alignment combinations of fixed-size deduplication data blocks to form one of an even number of aligned, fixed-size deduplication data blocks and an odd number of aligned, fixed-size deduplication data blocks.

In one embodiment, the present invention performs all of and/or at least one of: looking up, in parallel or sequentially, the stored deduplicated data fingerprints for each one of the fingerprints, looking up the stored deduplicated data fingerprints for only the fingerprints of a predetermined number of fixed-size deduplication data blocks, looking up the stored deduplicated data fingerprints for each one of the fingerprints for a current available alignment and a next available alignment by sequentially traversing each one of the plurality of alignment combinations of fixed-size deduplication data blocks, looking up the stored deduplicated data fingerprints for an nth number of fingerprints in the current available alignment, wherein the current available alignment is continuously used for one of the plurality of alignment combinations of fixed-size deduplication data blocks if the nth number fingerprints exist in a lookup database, and looking up the stored deduplicated data fingerprints for an nth number of fingerprints in one of the plurality of alignment combinations of fixed-size deduplication data block. In one embodiment, the present invention uses a current alignment variable for at least one of the plurality of alignment combinations.

In one embodiment, the present invention performs all of and/or at least one of: sequentially traversing each one of the fixed-size deduplication data blocks, selecting an nth number of subsequent, fixed-size deduplication data blocks after each one of the fixed-size deduplication data blocks prior to traversing to a next one of the fixed-size deduplication data blocks, determining if one of the nth number of the fixed-size deduplication data blocks contains the current alignment variable, selecting as a preferred deduplication data block alignment the one of the nth number of the fixed-size deduplication data blocks having the current alignment variable, wherein the one of the nth number of the fixed-size deduplication data blocks having the current alignment variable is not selected if: a fingerprint of the one of the nth number of the fixed-size deduplication data blocks does not match one of the stored deduplicated data fingerprints the stored deduplicated data fingerprints, and the fingerprint of the one of the nth number of the fixed-size deduplication data blocks not having the current alignment variable matches one of the stored deduplicated data fingerprints. In one embodiment, the present invention selects as the preferred deduplication data block alignment from the plurality of alignment combinations of fixed-size deduplication data blocks.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for lookup-based data block alignment for data deduplication using a processor device in a computing environment, the method comprising:
    calculating fingerprints for each one of a plurality of alignment combinations of fixed-size deduplication data blocks and comparing each of the fingerprints to stored deduplicated data fingerprints in a lookup database for determining a preferred deduplication data block alignment; and
    performing at least one of:
        looking up, in parallel or sequentially, the stored deduplicated data fingerprints for each one of the fingerprints,
        looking up the stored deduplicated data fingerprints for only the fingerprints of a predetermined number of fixed-size deduplication data blocks,
        looking up the stored deduplicated data fingerprints for each one of the fingerprints for a current available alignment and a next available alignment by sequentially traversing each one of the plurality of alignment combinations of fixed-size deduplication data blocks,
        looking up the stored deduplicated data fingerprints for an nth number of fingerprints in the current available alignment, wherein the current available alignment is continuously used for one of the plurality of alignment combinations of fixed-size deduplication data blocks if the nth number fingerprints exist in a lookup database, and
        looking up the stored deduplicated data fingerprints for an nth number of fingerprints in one of the plurality of alignment combinations of fixed-size deduplication data block.

2. The method of claim 1, further including performing at least one of:
    determining which one of the plurality of alignment combinations to use as the preferred deduplication data block alignment, and
    providing a plurality of hints for determining the preferred deduplication data block alignments.

3. The method of claim 1, further including adjusting the plurality of alignment combinations of the fixed-size deduplication data blocks to form one of an even number of aligned, fixed-size deduplication data blocks and an odd number of aligned, fixed-size deduplication data blocks.

4. The method of claim 1, further including using a current alignment variable for at least one of the plurality of alignment combinations.

5. The method of claim 4, further including performing at least one of:
    sequentially traversing each one of the fixed-size deduplication data blocks,
    selecting an nth number of subsequent, fixed-size deduplication data blocks after each one of the fixed-size deduplication data blocks prior to traversing to a next one of the fixed-size deduplication data blocks,
    determining if one of the nth number of the fixed-size deduplication data blocks contains the current alignment variable,
    selecting as a preferred deduplication data block alignment the one of the nth number of the fixed-size deduplication data blocks having the current alignment variable, wherein the one of the nth number of the fixed-size deduplication data blocks having the current alignment variable is not selected if:
        a fingerprint of the one of the nth number of the fixed-size deduplication data blocks does not match one of the stored deduplicated data fingerprints the stored deduplicated data fingerprints, and
        the fingerprint of the one of the nth number of the fixed-size deduplication data blocks not having the current alignment variable matches one of the stored deduplicated data fingerprints.

6. The method of claim 1, further including selecting as the preferred deduplication data block alignment from the plurality of alignment combinations of fixed-size deduplication data blocks.

7. A system for lookup-based data block alignment for data deduplication in a computing environment, the system comprising:
    at least one processor device operable in the computing environment, wherein the at least one processor device:
        calculates fingerprints for each one of a plurality of alignment combinations of fixed-size deduplication data blocks and comparing each of the fingerprints to stored deduplicated data fingerprints in a lookup database for determining a preferred deduplication data block alignment, wherein a deduplication data block comprises each of the fixed-size deduplication data blocks, and
    performs at least one of:
        looking up, in parallel or sequentially, the stored deduplicated data fingerprints for each one of the fingerprints, looking up the stored deduplicated data fingerprints for only the fingerprints of a predetermined number of fixed-size deduplication data blocks, looking up the stored deduplicated data fingerprints for each one of the fingerprints for a current available alignment and a next available alignment by sequentially traversing each one of the plurality of alignment combinations of fixed-size deduplication data blocks, looking up the stored deduplicated data fingerprints for an nth number of fingerprints in the current available alignment, wherein the current available alignment is continuously used for one of the plurality of alignment combinations of fixed-size deduplication data blocks if the nth number fingerprints exist in a lookup database, and looking up the stored deduplicated data fingerprints for an nth number of fingerprints in one of the plurality of alignment combinations of fixed-size deduplication data block.

8. The system of claim 7, wherein the at least one processor device that performs each one of:

determining which one of the plurality of alignment combinations to use as the preferred deduplication data block alignment, and providing a plurality of hints for determining the preferred deduplication data block alignments.

9. The system of claim 7, wherein the at least one processor device adjusts the plurality of alignment combinations of fixed-size deduplication data blocks to form one of an even number of aligned, fixed-size deduplication data blocks and an odd number of aligned, fixed-size deduplication data blocks.

10. The system of claim 7, wherein the at least one processor device that uses a current alignment variable for at least one of the plurality of alignment combinations.

11. The system of claim 10, wherein the at least one processor device performs at least one of:

sequentially traversing each one of the fixed-size deduplication data blocks, selecting an nth number of subsequent, fixed-size deduplication data blocks after each one of the fixed-size deduplication data blocks prior to traversing to a next one of the fixed-size deduplication data blocks, determining if one of the nth number of the fixed-size deduplication data blocks contains the current alignment variable, and selecting as a preferred deduplication data block alignment the one of the nth number of the fixed-size deduplication data blocks having the current alignment variable, wherein the one of the nth number of the fixed-size deduplication data blocks having the current alignment variable is not selected if:

a fingerprint of the one of the nth number of the fixed-size deduplication data blocks does not match one of the stored deduplicated data fingerprints the stored deduplicated data fingerprints, and the fingerprint of the one of the nth number of the fixed-size deduplication data blocks not having the current alignment variable matches one of the stored deduplicated data fingerprints.

12. The system of claim 7, wherein the at least one processor selects as the preferred deduplication data block alignment from the plurality of alignment combinations of fixed-size deduplication data blocks.

13. A computer program product for lookup-based data block alignment for data deduplication using a processor device, the computer program product comprising a non-transitory computer-readable storage medium having computer-readable program code portions stored therein, the computer-readable program code portions comprising:

a first executable portion that:

calculates fingerprints for each one of a plurality of alignment combinations of fixed-size deduplication data blocks and comparing each of the fingerprints to stored deduplicated data fingerprints in a lookup database for determining a preferred deduplication data block alignment, wherein a deduplication data block comprises each of the fixed-size deduplication data blocks; and performs at least one of:

looking up, in parallel or sequentially, the stored deduplicated data fingerprints for each one of the fingerprints, looking up the stored deduplicated data fingerprints for only the fingerprints of a predetermined number of fixed-size deduplication data blocks, looking up the stored deduplicated data fingerprints for each one of the fingerprints for a current available alignment and a next available alignment by sequentially traversing each one of the plurality of alignment combinations of fixed-size deduplication data blocks, looking up the stored deduplicated data fingerprints for an nth number of fingerprints in the current available alignment, wherein the current available alignment is continuously used for one of the plurality of alignment combinations of fixed-size deduplication data blocks if the nth number fingerprints exist in a lookup database, and looking up the stored deduplicated data fingerprints for an nth number of fingerprints in one of the plurality of alignment combinations of fixed-size deduplication data block.

14. The computer program product of claim 13, further includes a second executable portion that performs at least one of:

determining which one of the plurality of alignment combinations to use as the preferred deduplication data block alignment, and providing a plurality of hints for determining the preferred deduplication data block alignments.

15. The computer program product of claim 13, further includes a second executable portion that adjusts the plurality of alignment combinations of fixed-size deduplication data blocks to form one of an even number of aligned, fixed-size deduplication data blocks and an odd number of aligned, fixed-size deduplication data blocks.

16. The computer program product of claim 13, further includes a second executable portion that performs at least one of:

uses a current alignment variable for at least one of the plurality of alignment combinations, sequentially traversing each one of the fixed-size deduplication data blocks, selecting an nth number of subsequent, fixed-size deduplication data blocks after each one of the fixed-size deduplication data blocks prior to traversing to a next one of the fixed-size deduplication data blocks, determining if one of the nth number of the fixed-size deduplication data blocks contains the current alignment variable, and selecting as a preferred deduplication data block alignment the one of the nth number of the fixed-size deduplication data blocks having the current alignment variable, wherein the one of the nth number of the fixed-size deduplication data blocks having the current alignment variable is not selected if:
- a fingerprint of the one of the nth number of the fixed-size deduplication data blocks does not match one of the stored deduplicated data fingerprints the stored deduplicated data fingerprints, and
- the fingerprint of the one of the nth number of the fixed-size deduplication data blocks not having the current alignment variable matches one of the stored deduplicated data fingerprints.

17. The computer program product of claim 13, further includes a second executable portion that selects as the preferred deduplication data block alignment from the plurality of alignment combinations of fixed-size deduplication data blocks.

\* \* \* \* \*